Inventor:
C. Petersen
by H. R. Kerslake
Attorney

Patented Jan. 23, 1923.

1,443,091

UNITED STATES PATENT OFFICE.

CHRISTIAN PETERSEN, OF CHRISTIANIA, NORWAY.

METHOD FOR TRANSFORMING THE KINETIC ENERGY IN GASES INTO ELECTRICAL ENERGY AND MANNER FOR UTILIZING THE LATTER FOR CARRYING OUT GAS REACTIONS.

Application filed January 4, 1919. Serial No. 269,607.

*To all whom it may concern:*

Be it known that CHRISTIAN PETERSEN, engineer, subject of Norway, residing at Christiania, Bogstadveien 25, has invented certain new and useful improvements in a method for transforming the kinetic energy in gases into electrical energy and manner for utilizing the latter for carrying out gas reactions, of which the following is a specification.

The present invention relates to a method for transforming the kinetic energy in gases into electrical energy, in accordance with which method gases or steam are moved in a magnetic flux, and is characterized thereby, that the gases with greater or less force are blown into the flux through channels or the like arranged in such a manner that the gases are caused to rotate in the flux before leaving it.

The invention also has for its object entirely or in part, to utilize the electrical energy and the heat energy respectively produced in this manner for carrying out gas reactions in the gases passing through the flux, for instance for producing nitric oxide.

As known the conductivity of the gases is caused by the free ions and electrons respectively contained in the gases. When a gas, which is able to conduct the electricity or is ionized, is moved through a magnetic flux across the direction of the flux lines, an electrical current will be produced, the positive ions being forced in one direction by the flux, and the negative ions and the electrons respectively being forced in the opposite direction.

In the case of most gases, including hot gases of combustion, they are, however, so little ionized that the electric current produced by the passing of the gases in a straight direction through the flux, is very inconsiderable. If a greater current of production of electric energy is to be obtained, a sufficient concentration especially of the negative ions and the electrons respectively must be provided for, and therefore said ions or electrons, together with the gases, must not be brought too quickly out of the flux. In accordance with the present invention this is obtained by causing the gases to rotate with great speed in the flux.

The accompanying drawing illustrates a preferred construction of an apparatus which embodies the said method.

Figure 1:
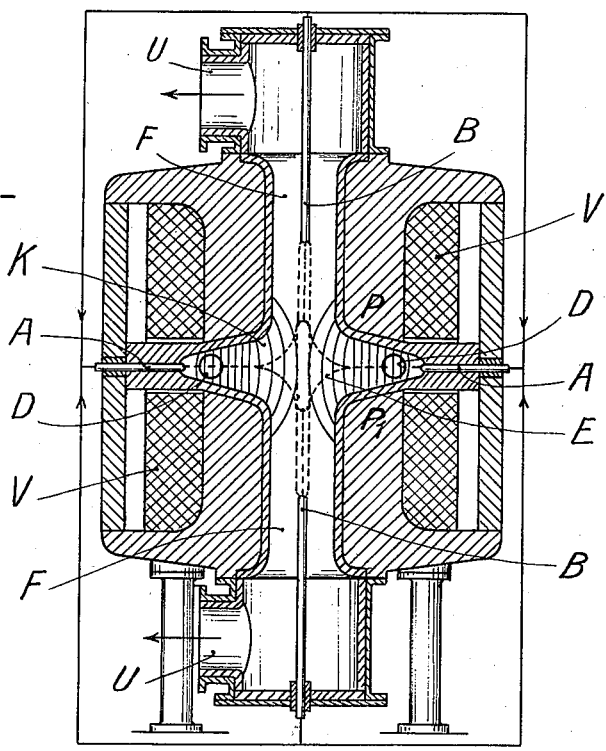
Figure 2:
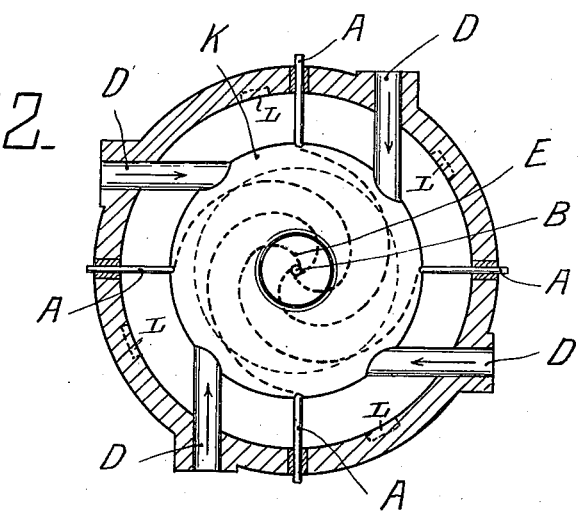

Figure 1 is a vertical section, and Figure 2 a horizontal section through the apparatus.

K is the chamber within the apparatus, through which chamber passes the flux between the poles P P' of a magnet. V V indicates the wire coils of the magnet. The gases, for instance steam, hot gases of combustion, air and the like, pass with great velocity through the pipes D, provided tangentially into the chamber K. Here the gases are forced to rotate in spirals, and will during their rotation pass through the central channel F and leave the apparatus through the outlets U.

Under the influence of the flux the ions and the electrons respectively contained in the gases are forced in spirals in a direction towards the centre of rotation, and here the pressure will be very low owing to the great rotational velocity.

During their passage towards the centre of rotation and also at the centre, the ions and the electrons respectively come into contact with neutral gas molecules, these thereby being decomposed into ions and electrons. The electrons flow in contact with central electrodes B and produce an electric current, and will through conducting wires pass to the electrodes A and therefrom back into the chamber K. Here the electrons will be mixed with the gases blown into the chamber and together with these caused to rotate, whereafter they together with the negative ions and electrons respectively contained in the gases again will pass into the central electrodes. The positive ions partly will be carried away out of the chamber by the gases, and partly deliver their electricity to the walls of the chamber, which walls may be electrically conductive. The positive ions also will deliver their electricity to the electrodes A, which also may be constructed as a continuous, annular electrode. Even in gases which originally are ionized to a very small degree a considerable number of negative ions and electrons respectively, are thus concentrated during a short time. The central electrodes being constantly bombarded by negative ions and electrons they will begin to glow and then emit ultra-violet rays, which will effect the ionization of the gases. Of course, the negative ions and electrons respectively may by the influence of the flux be brought to the electrodes A provided at the periphery and then pass back to the chamber K through the central electrodes B. Further the positive ions partly may be removed from the chamber by the gases and partly deliver their electricity to the central electrodes. In order to effect the beginning of or an increase in the ionization there may be provided in the chamber K, for instance in the centre of rotation, one or more mercury vapor lamps L capable of emitting ultra-violet rays. For producing the electric current when the apparatus is put into action the electrodes may be supplied with constant or alternating current with a high voltage. The electrodes B may be constructed so as to come into contact with each other, and one of the central outlets for the gases may be dispensed with.

If the electric energy produced is used only for producing gas reactions in the gases passing through the magnetic flux, the electrodes may be dispensed with or they may only be provided as auxiliary electrodes, the electric whirling currents induced in the gases being sufficient for this purpose.

If the gases used are those of combustion, the necessary speed may be obtained for instance by causing the combustion of coal, gas, oil or the like to take place under a suitable pressure and maintaining constant volume or constant pressure in the combustion chambers. The gases will then expand and be thereby caused to pass through channels or the like into the electromagnetic apparatus, where a considerable part of the kinetic energy as above described is transformed into electrical energy. As known, the ionization and conductivity in gases will increase, when the temperature is increased, so that when a sufficiently high temperature of combustion is used the gases at the moment of admission will be substantially conductive. For increasing the ionization the combustion may partly take place in the electromagnetic apparatus itself. The current necessary for the magnetization and the effect necessary for the compression of the combustion air and the fuel may be obtained from the electrical energy produced in the apparatus. This energy may also be utilized for other purposes, and the heat of the gases may be used for firing under steam boilers, melting, burning of tiles and the like.

By sufficient concentration of the direction of the electrical current in the apparatus, a sufficiently high temperature may be obtained for producing nitric oxide for example. For the production of nitric oxide in the gases passing through the magnetic flux the gases may contain an overplus of air, or the oxygen necessary for the production of nitric oxide may be procured by decomposing the carbonic acid or steam contained in the gases. For obtaining as high a temperature of the gases as possible the combustion air and fuel may be heated in advance by means of the gases leaving the electromagnetic apparatus, and the combustion air may be led round the apparatus.

As the chemical reaction by the production of nitric oxide and the effect used for the magnetization and the compression only require a small part of the heat contained in the gases of combustion, the greater part of this heat can be used for producing steam for other purposes, and this will reduce working costs by the production of nitric oxide and nitric acid or lime saltpetre respectively as by-products in great central steam installations.

If a mixture of steam and gases of combustion is used ammonia may be produced for example.

The electrical currents produced as above described may also be utilized for other purposes, for instance wireless telegraphy or other wireless transmission of power.

I claim:

1. A method for transforming the kinetic energy of gases into electrical energy, in accordance with which method gases or steam are moved in a magnetic flux, consisting in blowing the gases tangentially into the flux causing the gases to rotate in the flux before leaving it, substantially as hereinbefore described.

2. A method as claimed in claim 1, in which the gases used are gaseous products of combustion, substantially as described.

3. A method as claimed in claim 1, in which the electrical energy and the heating power respectively produced, are wholly or partly utilized for the production of nitric oxides or for producing other gas reactions in the gases passing through the flux, substantially as described.

In testimony whereof I affix my signature in presence of two witnesses.

CHRISTIAN PETERSEN.

Witnesses:
T. V. SHALLING,
G. ISSY EINSTEIN.